POWER DRIVING MECHANISM FOR INSTRUMENTALITIES OF TYPEWRITERS

Original Filed Sept. 30, 1957 4 Sheets-Sheet 1

JOSEPH P. BARKDOLL
INVENTOR

BY Theodore E. Simonton
ATTORNEY

POWER DRIVING MECHANISM FOR INSTRUMENTALITIES OF TYPEWRITERS

Original Filed Sept. 30, 1957 4 Sheets-Sheet 2

JOSEPH P. BARKDOLL
INVENTOR

BY Theodore L. Simonton
ATTORNEY

POWER DRIVING MECHANISM FOR INSTRUMENTALITIES OF TYPEWRITERS

Original Filed Sept. 30, 1957 4 Sheets-Sheet 3

JOSEPH P. BARKDOLL
INVENTOR

BY Theodore E. Simonton
ATTORNEY

POWER DRIVING MECHANISM FOR INSTRUMENTALITIES OF TYPEWRITERS

Original Filed Sept. 30, 1957 4 Sheets-Sheet 4

JOSEPH P. BARKDOLL
INVENTOR

BY Theodore L. Simonton
ATTORNEY

United States Patent Office

Re. 25,024
Reissued Aug. 15, 1961

25,024

POWER DRIVING MECHANISM FOR INSTRUMENTALITIES OF TYPEWRITERS

Joseph P. Barkdoll, Groton, N.Y., assignor to Smith-Corona Marchant Inc., Syracuse, N.Y., a corporation of New York Original No. 2,921,660, dated Jan. 19, 1960, Ser. No. 686,927, Sept. 30, 1957. Application for reissue Aug. 26, 1960, Ser. No. 53,584
20 Claims. (Cl. 197—17)

Matter enclosed in heavy brackets [ ] appears in the original patent but forms no part of this reissue specification; matter printed in italics indicates the additions made by reissue.

This invention relates to improvements in power driving mechanism for instrumentalities of typewriters. More particularly the invention relates to improvements in power driving mechanism of the kind including a power roll, such as toothed snatch roll, to actuate the type bars and other instrumentalities of a typewriter, an electric motor, and means for constantly rotating the power roll by power from the motor while the typewriter is in use, the drive from the motor to the power roll preferably having provisions for varying the rotative speed of the roll to vary the operating force transmitted to the type bars or other instrumentalities of the typewriter.

The principal purposes of the invention are to provide a power driving mechanism of the kind above set forth making possible the production of a commercially feasible portable power typewriter of small size and light weight; to provide an improved change speed power roll drive for typewriters of simple and efficient construction for typist control of the force of impact of the types of the typewriter; to provide a power roll drive for power typewriters wherein stalling of the motor is prevented incident to starting load or to jamming of the type bars or other roll driven parts of the typewriter; and to provide a power roll drive effective to bring about unjamming of jammed type bars.

Other purposes and advantages of the invention will appear from the following description of the preferred embodiments of the invention illustrated in the accompanying drawings in which.

Figure 1:
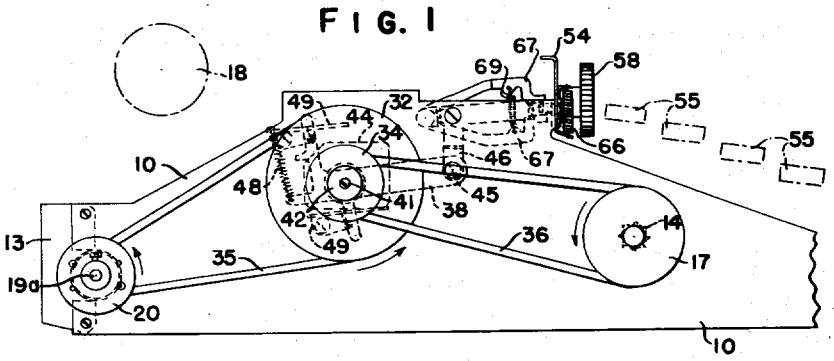
FIGURE 1 is a fragmentary left hand side elevation of a portable typewriter equipped with a power driving mechanism embodying the invention, the view showing only some of the conventional typewriter parts.
Figure 2:
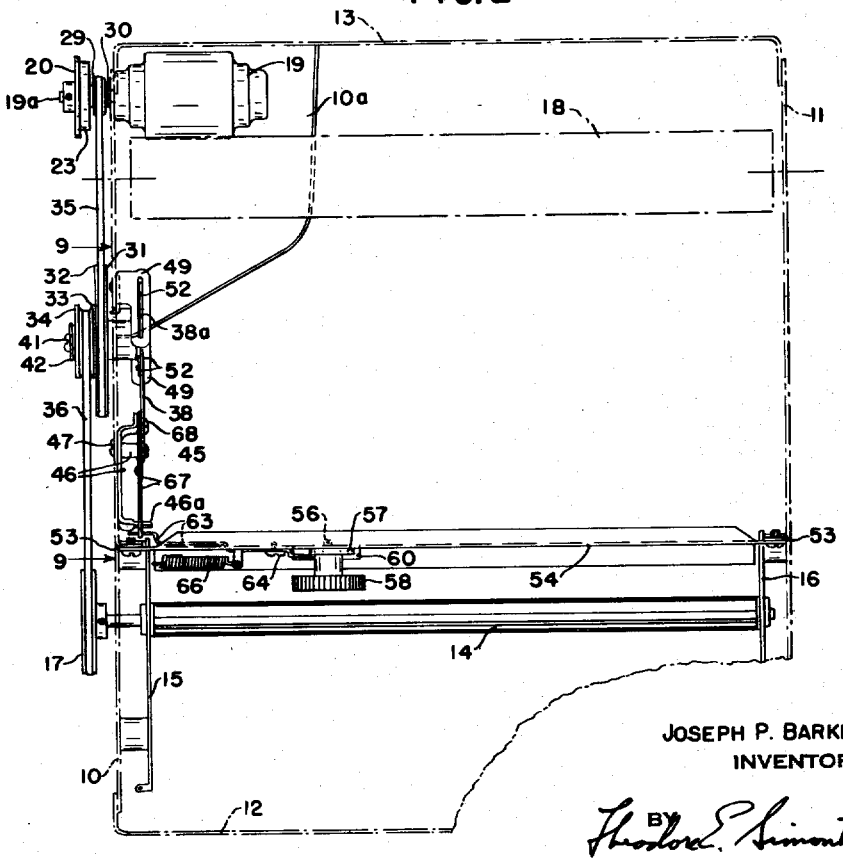
FIGURE 2 is a fragmentary plan view of the improved typewriter some parts of which are shown in broken lines.
Figure 4:
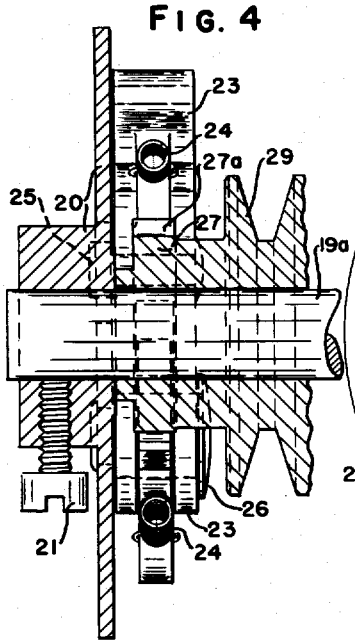
FIG. 4 is a sectional view on the line 4—4 of FIGURE 3.

The invention is illustrated by way of example as embodied in a portable typewriter of small size and weight, which, except for key controlled power driving means for its type bars and other instrumentalities, is similar to the well known "Smith-Corona" portable typewriter shown in part in United States Patent 1,981,982, issued November 27, 1934, to H. A. Avery. Only so much of the known manual or key operated typewriter is shown as is necessary to illustrate the application thereto of the improved power mechanism and the size and arrangement of the parts of that mechanism as embodied in the known small typewriter. Since the invention may be applied to other typewriters, and since the means whereby power is transmitted to the type bars and other instrumentalities may be of many known constructions, the power roll actuated parts of the typewriter are not shown. The improvements, as illustrated, now will be described.

The typewriter has a main frame including side plates 10 and 11, a front cross or end plate 12 and a rear cross or end plate 13. The power roll 14 is of known construction and is journalled in sub-frame plates 15 and 16 secured to the side plates at the inner sides of the side plates, said roll preferably, and as shown, being a metal and toothed snatch roll of small diameter (preferably approximately 13/32 inch). The snatch roll extends horizontally across the main frame in the forward portion of the frame and has fixed on its left hand end at the outer face of the left hand side plate 10 a V-pulley 17 forming part of a change speed pulley and V-belt drive for the snatch roll. The known platen 18 is mounted on the known platen carriage, not shown, to receive type impacts at a printing point on the upper front portion of the platen.

Figure 3:
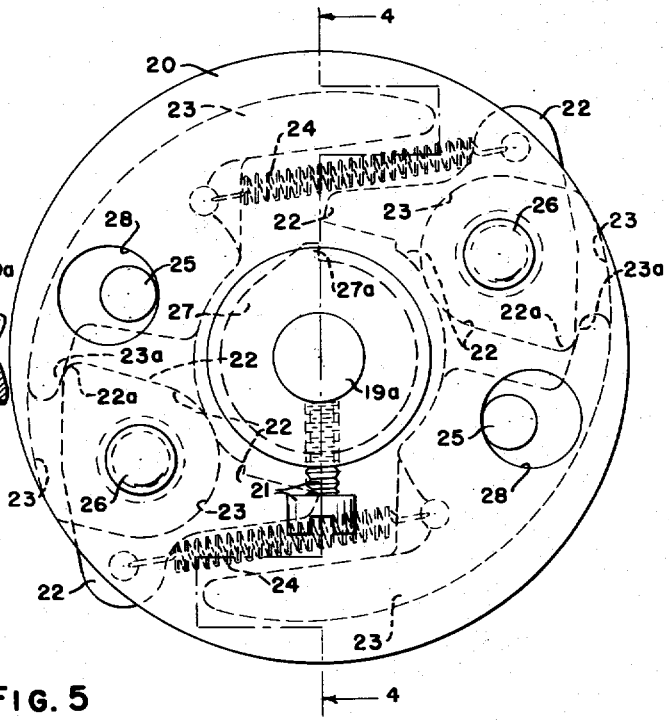
FIGURE 3 is an enlarged detail view of a centrifugal clutch forming part of the power drive, the clutch parts being shown in rest or idle condition.
Figure 5:
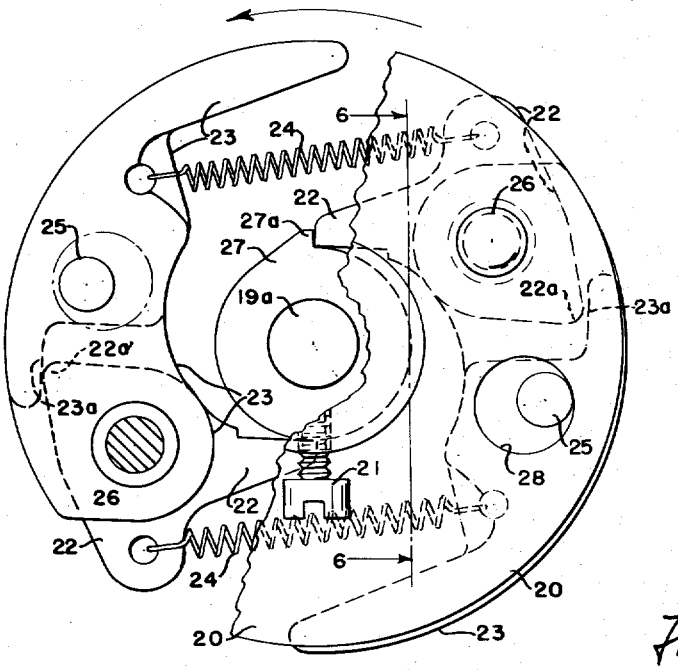
FIGURE 5 is a view similar to FIGURE 3 showing the clutch parts with the clutch in running motion-transmitting condition.
Figure 6:
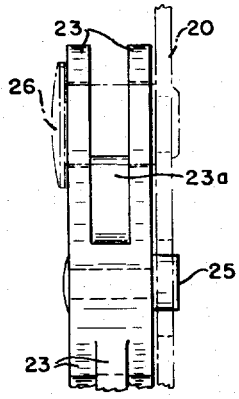
FIGURE 6 is a detail sectional view on the line 6—6 of FIGURE 5.
Figure 7:
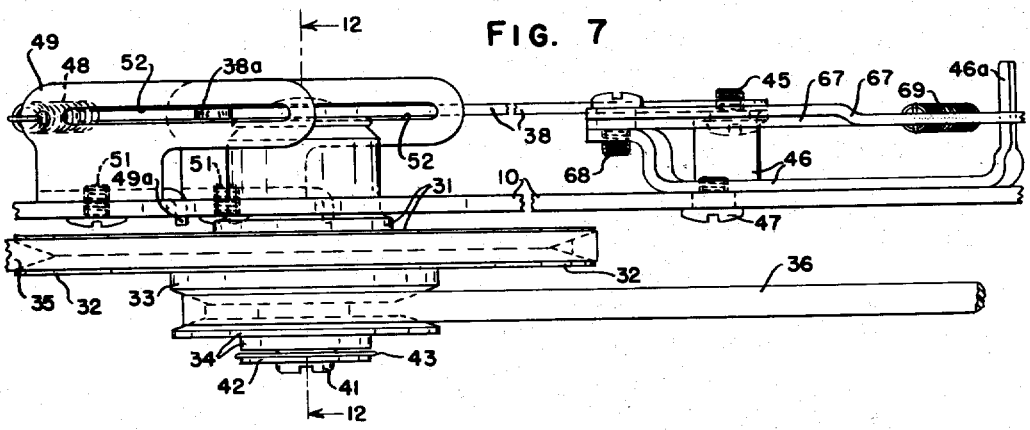
FIGURE 7 is a plan view of the variable speed driving pulley of the power mechanism and its support plate and associated parts, the pulley being in low speed driving condition.
Figure 8:
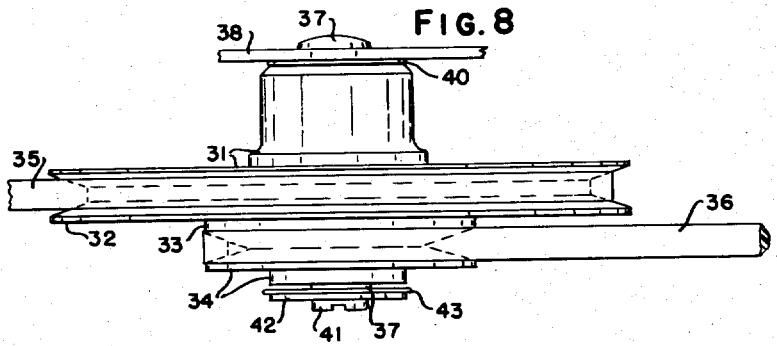
FIGURE 8 is a view similar to FIGURE 7 with the pulley in high speed driving condition.
Figure 9:
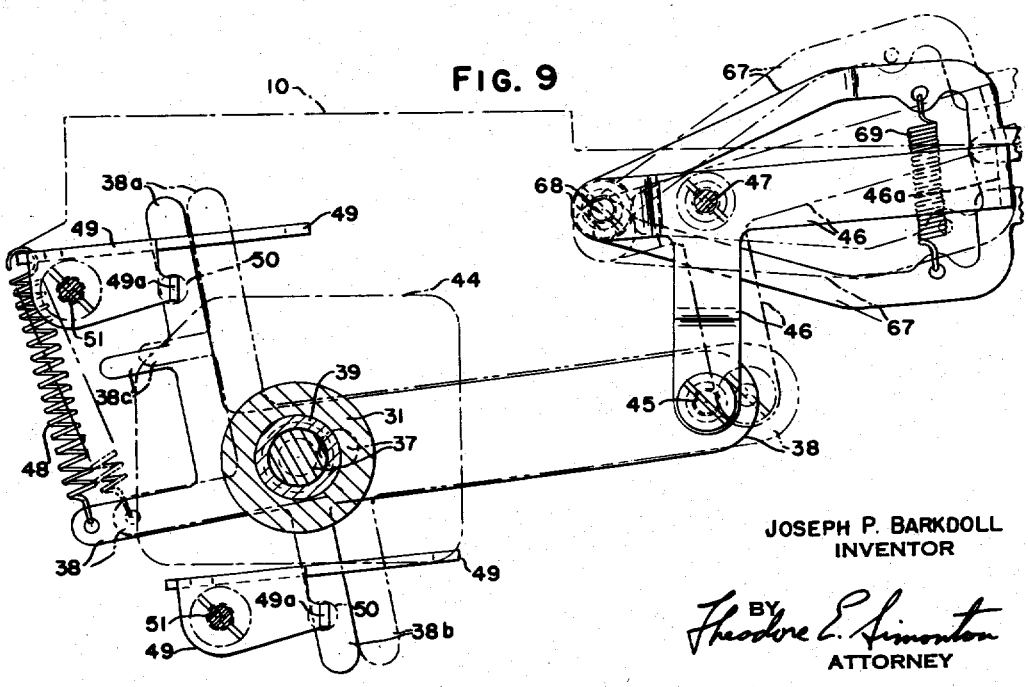
FIGURE 9 is a detail sectional view on the line 9—9 of FIGURE 2 showing parts of the speed changing means.
Figure 10:
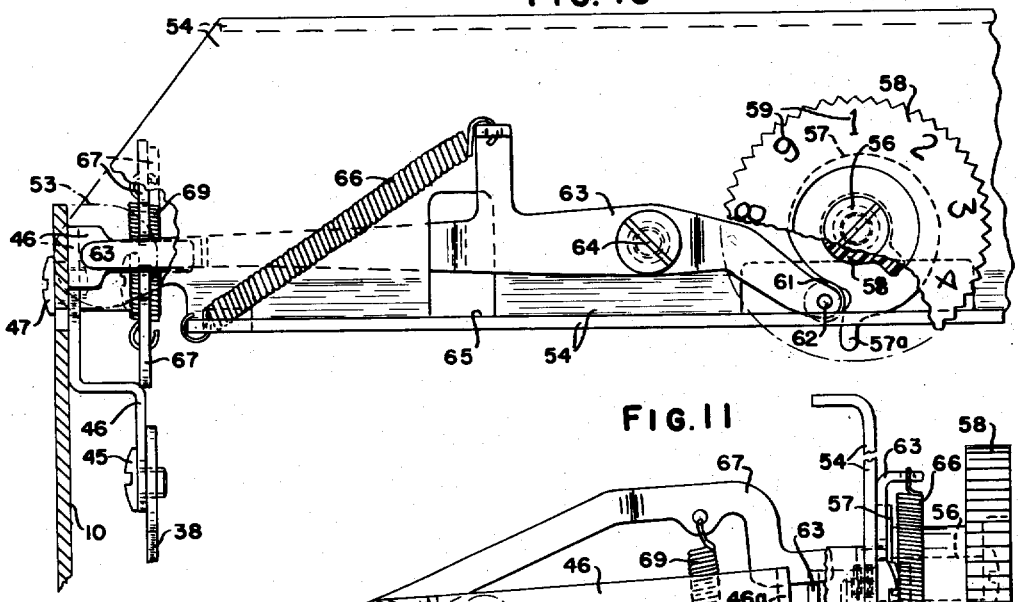
FIGURE 10 is a detail front elevation showing parts of the speed changing means.
Figure 11:
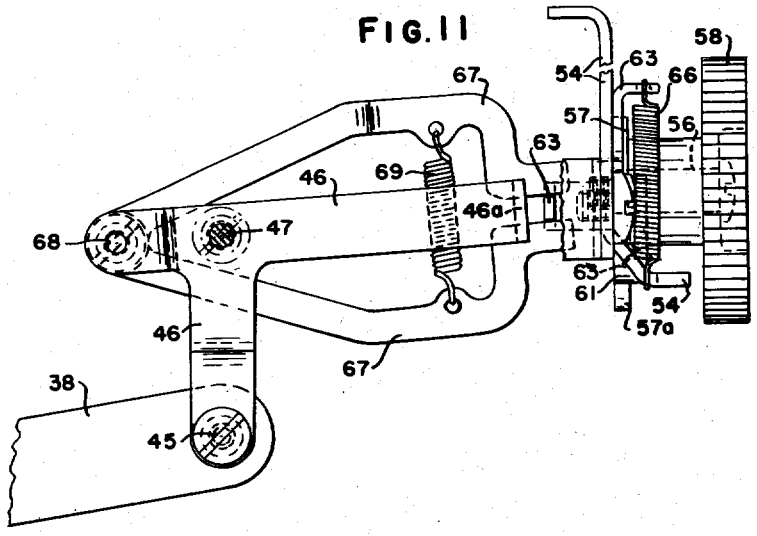
FIGURE 11 is a detail side elevation of the parts shown in FIGURE 10.
Figure 12:
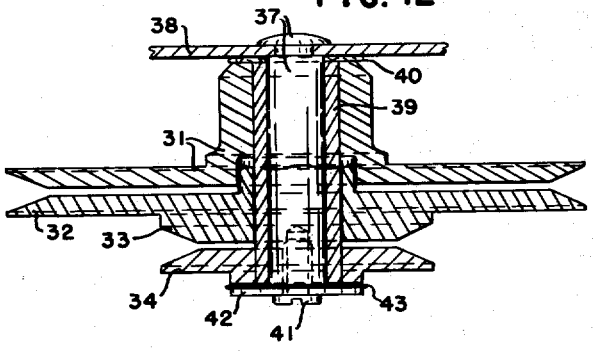
FIGURE 12 is a detail sectional view of the change speed pulley on the line 12—12 of FIGURE 7, with the pulley in mid-speed driving condition.

A small electric motor 19 is suitably mounted in the extreme lower rear left hand corner of the main frame on a plate 10a secured to the frame with the motor drive shaft 19a projecting horizontally outwardly through the side plate 10 and an overlapping end portion of plate 13 and being rotative counterclockwise, as viewed in FIGURES 1, 3 and 5, when the motor is energized by the closing of a suitable switch, not shown, mounted on the typewriter. The motor is a known alternating current motor of small fractional horsepower having a speed of 3450 r.p.m. when running synchronously without load, and a lesser operating speed which depends upon the load. It is less than 2½ inches long, exclusive of the projecting shaft, 2½ inches high and less than 3 inches wide. The motor consequently occupies very little space in the typewriter and only slightly adds to the weight of the typewriter. The speed of the motor is considerably greater than that desirable for the power roll 14. To make possible the use of such a motor to drive the power roll with a desired range of speed and with ample power to handle the work loads imposed on the power roll in actuating the type bars and other instrumentalities of the typewriter, and to attain other ends hereinafter pointed out, the following described means are provided for driving the power roll from the motor shaft, the power roll in the typewriter shown being rotatively driven in the same direction as the motor shaft as indicated by the arrows in FIGURE 1.

Referring particularly to FIGURES 1 to 6, a very small speed responsive centrifugal clutch of the positive clutch type is provided for driving a typist controllable change speed pulley and belt drive connecting the driven element of the clutch with the power roll. This clutch is conditioned to engage when the motor attains a rated speed determined by the construction of the clutch, or substantially that speed, and to disengage when the motor speed or the r.p.m. of the clutch drops below that rated speed for any reason. The rated speed of the clutch must of course be substantially below the unloaded speed of the motor.

The speed responsive positive clutch is mounted on the outer or left hand end portion of motor shaft 19a. The driving part of the clutch comprises a disk 20 having a hub which is fixed on shaft 19a to rotate therewith by a locking screw 21, two diametrically opposed clutch dogs 22, two diametrically opposed dog controlling weights 23, two diametrically opposed weight and dog controlling springs 24, two weight stop pins 25, and two diametrically opposed pivot pins 26 one for each dog and an associated weight. The dogs, weights and springs are located at the inner or right hand face or disk 20.

Each weight 23 is of general segmental form and has a recessed or forked end portion pivotally held to disk 20 near the disk periphery by one of the pivot pins 26 and loosely embracing the outer end portion of one of the dogs 22 which dog portion also is pivotally held to said pin 26. Each spring 24 is connected at its ends with a dog pivoted on one pin 26 and a weight pivoted on the other pin 26 and constantly tending to rock the weight inwardly toward the disk axis and press an abutment 23a on that weight against an abutment 22a on the other dog to hold the dog normally disengaged from the driven part of the clutch, as shown in FIGURE 3. The driven part of the clutch comprises a sleeve or hub-like part 27 rotative on and relatively to the motor shaft 19a and abutting the inner face of disk 20, the part 27 having a single radial clutch tooth 27a provided with a dog nose engageable flat face radial to the shaft axis. The clutch dogs have noses extending inwardly at opposite sides of the sleeve in opposite directions and provided with clutch tooth abutting end faces extending to a plane containing the shaft axis in the engaging position of the clutch. The dog noses are adapted to ride on the cylindrical periphery of the clutch part 27. The stop pins 25 are fixed to the weights to engage opposite sides of apertures 28 in disk 20 to limit rocking of the weights in both directions, as indicated in FIGURE 3 and at the right side of FIGURE 5. At the left side of FIGURE 5, the parts are shown in an intermediate position in which the dog 22 is fully engaged with tooth 27a and abutments 22a and 23a are still in contact, the weight 23 not yet having been thrown out by centrifugal force to its limit position.

The spring pull on the weights normally overcomes the spring pull on the dogs and holds the clutch in disengaged condition except when the motor is running at or above the rated speed of the clutch. As the motor speed increases, the weights swing outwardly under centrifugal force and, upon attainment of the rated speed, the weight pressure on the dogs is sufficiently relieved and the weights are rocked sufficiently outward to permit the spring pull on the dogs to rock the dogs sufficiently for end engagement of the dog noses with the tooth on the driven clutch part, the first dog to engage said tooth thereupon positively driving the driven clutch part at the speed of the motor shaft. The face of tooth 27a opposite its dog engagement face is beveled preferably, as shown. The clutch is very small, having an overall diameter of approximately 1¼ inches.

The pulley 17 fixed on the left hand end of the snatch roll 14 forms part of a speed reducing and power increasing V-pulley and V-belt drive from the driven clutch part to the snatch roll, said drive being a typist controllable speed drive. This drive now will be described referring particularly to FIGURES 1 and 2 and FIGURES 7 to 12 of the drawings.

A very small V-belt pulley 29 is mounted on the motor shaft 19 between the clutch and the frame side plate 10 and is rotative relatively to said shaft, the hub of the pulley preferably being formed integrally with that of the driven clutch member 27, or secured thereto by brazing or the like, and abutting a suitable washer 30 interposed between side plate 10 and the pulley hub. Intermediate the pulleys 17 and 29 is an assembly of two coaxial pulleys located just outside of frame plate 10. The innermost one of the coaxial pulleys is a variable diameter divided pulley 31—32 of the V-belt type of much greater overall diameter than pulley 29, and the outer one of these pulleys is a variable diameter V-belt pulley 33—34 much smaller in diameter than the divided or speed-changing pulley 31—32. In the construction shown, the overall diameter of pulley 31—32 is approximately four times that of pulley 29 and twice that of pulley 33—34, and the diameter of pulley 17 is approximately one and one-third times that of pulley 33—34. The pulley 29 is connected with the divided pulley 31—32 by a V-belt 35, and the pulley 33—34 is connected with pulley 17 by a V-belt 36. The ratio between motor and power roll, consequently, is slightly more than 7 to 1 at the low side of the range of the variable speed pulley, and approximately 5½ to 1 at the high end of the range.

The high speed and low torque drive of the motor shaft is thus converted to a relatively low speed and high torque drive of the power roll. The means shown for supporting and adjusting the intermediate pulley assembly where a typist may vary the rotative speed of the power roll now will be described.

The outer half of pulley 31—32 and the inner half of pulley 33—34 preferably are formed integrally with each other, or are secured together, so that one pulley axially expands as the other axially contracts. A short horizontal pulley shaft 37 is fixed to a pulley supporting bar 38 and carries a bearing sleeve 39 for the pulleys on which the pulley halves 31 and 34 and the united pulley halves 32—33 are severally axially slidable. The inner ends of sleeve 39 and of the hub of pulley half 31 are abuttive with a compressible felt oiler washer 40 interposed therebetween and the outer face of bar 38. A screw 41 holds to the outer end of the pulley shaft 37 a metal washer 42 between which and the outer end of the sleeve 37 and the outer end of the hub of pulley section 34 is held a compressible felt oiler washer 43. Axial movement of the pulley assembly is thus positively limited. There is sufficient end play between the pulley parts to permit relative axial adjustment thereof to effect speed changes within the desired range and, particularly with the aid of the compressible washers, to permit sufficient bodily axial floating of the pulley assembly for running of the belts in at least substantially straight paths at all times.

The bar 38 extends fore and aft of the machine and is mounted slightly inside of the frame plate 10 for movements to shift the pulley shaft 37 and the intermediate pulley assembly bodily in a general up and down direction for maintaining a proper driving tension on belts 35 and 36 and in a general fore and aft direction for changes of speed of the snatch roll, as will now be more fully described, the hub of pulley half 31 being movable up and down and fore and aft in a large aperture 44 in frame plate 10 to permit such movements of the pulley assembly.

To the ends just described, the forward end of the bar 38 is pivotally supported by a horizontal pivot 45 on the lower end of a pendent arm of a bellcrank lever 46. Lever 46 is located just inside the frame plate 10 to which it is pivotally held by a horizontal pivot 47 and has a forwardly extending arm with an inwardly bent reduced end portion 46a. The bar 38 is supported at its rear end behind the pulley shaft 37 on the lower end of a bar-supporting and belt tensioning spring 48, the upper end of the pendent spring being held to the upper one of two like and superposed guide brackets 49 for the bar. Each guide bracket 49 has a lug 49a fitted in a hole 50 in the side plate 10, and each bracket also is held to the side plate by a screw 51, the brackets being located at the inner face of plate 10 and having inwardly turned substantially horizontal portions provided with closed fore and aft extending guide slots 52 for the bar. The bar has an upward extension 38a and a downward extension 38b slidably engaged in the guides lots of the respective brackets 49.

Spring 48 constantly exerts an upward belt tensioning pull on the bar 38 tending to rock the bar upwardly about its pivoted connection 45 with bellcrank lever 46. Fore and aft movement of the bar is effected by rocking the bellcrank lever 46 and is limited by the lengths of the closed guide slots 52. Up and down rocking of the bar is limited by engagement of the rear end of the bar with the lower bracket 49 and engagement of a rearward extension 38c of the bar with the lower surface of upper bracket 49. The spring 48 and pendent arm of bellcrank lever 46 form, in effect, a parallel link support for fore and aft adjustment of the bar 38 and the intermediate pulley assembly carried by the bar. Forward adjustment of the bar influences the belt pull to effect axial expansion of the pulley 31—32 and axial contraction of pulley 33—34 for increased speed of rotation of the snatch roll, and rearward adjustment of the bar results in axial contraction pulley 31—32 and axial expansion of pulley 33—34 for decreased speed of rotation of the snatch roll.

The means shown for rocking the bellcrank lever to change the rotative speed of the snatch roll now will be described.

Secured to inturned ears 53 on the main frame side plates 10 and 11 is a main frame crossplate 54 which has a rearwardly directed flange along its upper edge and a forwardly directed flange along its lower edge. Plate 54 extends across the upper part of the main frame above and behind the keyboard 55 of the typewriter and has mounted thereon a fore and aft extending stub axle means 56 upon which are journalled to rotate as a unit a cam 57 and a finger wheel or knob 58 for rotating the cam. The knob and cam are located at the front of plate 54, the knob being in front of the cam. The cam has a spiral periphery extending substantially entirely around its axis and also has a generally radial stop extension 57a projecting outwardly from the high and low ends of the spiral cam periphery. Desirably the knob is graduated around its front face with uniformly spaced numerals 59 (such as 1 to 9) for coaction with a suitable fixed indicator to show the various rotatively adjusted positions of the knob. Plate 54 is provided with a clearance aperture 60 (FIGURE 2) for cam 57 and its stop extension 57a.

The knob and cam are spaced inwardly a substantial distance from frame sideplate 10 with the spiral cam periphery engaged over a roller 61 which is journalled on a fore and aft extending pivot 62 on the right hand or inner end of a speed control lever 63. Aperture 60 in plate 54 also affords working clearance for roller 61 and the right hand end of lever 63. Lever 63 is fulcrumed on a fore and aft extending pivot 64 on plate 54, and to the left of pivot 64 the lever is offset through a clearance aperture 65 in plate 54 and extends behind said plate to a point adjacent frame side plate 10. A spring 66 is anchored to lever 63 and plate 54 to hold the roller 61 rocked upwardly against the periphery of cam 57. Opposite sides of cam stop extension 57a are abuttive with roller 61 to restrict rotation of the cam and knob 58 to one revolution, the stop extension preferably being curved at opposite sides to fit partly about the roller when engaged therewith. The cam periphery has a low pitch so that the spring urged lever, the cam and the knob will remain in their respective adjusted positions.

The [cutter] *outer* or left hand end portion of the speed control lever 63 is located slightly forwardly of the reduced inwardly bent forward end portion of the forwardly extending arm of the supporting bellcrank lever 46 for the forward end of the intermediate pulley assembly supporting bar 38. Said outer end portion of lever 63 has a yieldable two-way thrust transmitting and pressure equalizing connection with the bellcrank lever 46 comprising a pair of pressure equalizing and thrust transmitting arms 67 pivoted at their rear ends on the bellcrank lever 46 behind fulcrum 47 of that lever by a horizontal pivot 68 to swing about a common axis parallel to the fulcrum axis of the bellcrank lever. Arms 67 are connected adjacent their forward ends by a strong pull spring 69 which normally holds the arms engaged respectively with the upper and lower edges of the reduced end portion 46a of the forwardly extending bellcrank lever arm and also with the upper and lower edges of the left hand end portion of speed control lever 63.

Normally rocking of lever 63 in response to rotation of the knob and cam will rock the bellcrank lever and pressure equalizing arms as a unit about the lever pivot 47, spring 69 being strong enough for this purpose but being adapted to stretch under abnormal belt strain. The aforesaid connection betwen levers 46 and 63 also serves, together with the cam and spring 66, to normally maintain the two levers in any adjusted position to which they may be moved by rotation of the cam and knob. Rocking of the bellcrank lever to shift the intermediate pulley assembly rearwardly causes reduced speed of rotation of the snatch roll, and rocking of the bellcrank lever to shift the intermediate pulley assembly forwardly increases the rotative speed of the snatch roll.

The invention is particularly applicable to small portable typewriters and is shown embodied in one having a main frame approximately 12 inches long and 11½ inches wide. The construction shown occupies little space and adds little to the weight of the machine over one which is not power operated. On energizing the motor its shaft rotates without any load other than that of the driving part of the small clutch until the motor shaft attains the rated speed of the clutch, at which speed the motor has sufficient torque to drive the snatch roll without stalling or slowing up the motor. Burning out of the motor is thus avoided as is also such injury to the motor in the event the snatch roll becomes stalled upon jamming of type bars or other parts driven by the snatch roll. Stalling of the snatch roll will slow down the rotation of the clutch and cause the clutch to disengage instantly. De-energizing of the motor also will cause the clutch to disengage. The speed reducing and torque increasing drive from the motor to the snatch roll further contributes to the successful use of the tiny motor along with the centrifugal speed responsive clutch.

The speed responsive positive clutch cooperates with the belt drive upon jamming of type bars or other parts of the typewriter to facilitate, and in some cases to effect, disengagement from the toothed snatch roll of the known driving pawl used to connect such snatch roll actuated parts of power typewriters with the snatch roll. To the last-mentioned end, upon jamming of type bars or other parts, the snatch roll and clutch become stalled by snatch roll engaged driving pawls for the jammed parts, the positive clutch disengages suddenly, and the belt drive by reason of the resultant shock reversely rotates the snatch roll momentarily thus relieving the driving pressure of the roll teeth on the engaged pawls and in many instances freeing the jammed parts for return to their normal disconnected relation to the snatch roll. The quick reverse movement of the snatch roll permits the driving part of the clutch to quickly regain its rated speed and cause the clutch to re-engage. This rapid release and re-engagement of the clutch and reverse rotation of the snatch roll will be repeated as long as any snatch roll driven type bars are jammed. Due to the aforesaid reverse rotation of the roll, a light pressure by the typist on jammed type bars in type bar return direction will effect return of the type bars.

I claim:

1. A portable typewriter of small size and weight having a rotatively mounted toothed snatch roll extending horizontally across the typewriter for actuating type bar and other actions of the typewriter upon transitory connection of selected actions with the snatch roll, a small electric motor having a rotative drive shaft the speed of which is much higher than that desirable for the snatch roll and the torque output of which is much less than that required to be applied to the snatch roll to efficiently actuate the said actions, a speed responsive positive clutch having a driving part constantly connected with the motor shaft and a driven part positively engageable with the driving part only while the motor shaft is rotating substantially at or above a rated speed determined by said clutch, and a speed reducing and torque increasing pulley and belt snatch roll driving train constantly connecting the driven clutch part with the snatch roll for concomitant rotation of the driven clutch part and snatch roll, whereby upon engagement of said positive clutch the snatch roll is suddenly subjected to the momentum of said motor, and whereby each time continuous rotation of the roll is blocked during driving actuation of said driving train, said continuous rotation is converted into a rotary oscillative movement of the roll.

2. A portable typewriter, as claimed in claim 1, wherein the motor is mounted in a rear corner of the typewriter with its shaft extending horizontally transversely of the typewriter, the clutch is mounted on the motor shaft adjacent one side of the typewriter, the snatch roll is located in the forward portion of the typewriter, and the snatch roll driving train is located at said one side of the typewriter and includes a pulley fixedly held to one end of the snatch roll and a pulley fixedly connected with the driven clutch part and supported therewith on the motor shaft.

3. A portable typewriter, as claimed in claim 2, having a keyboard in the front portion thereof, and having a snatch roll driving train which includes typist settable means for varying the rotative speed of the snatch roll, said settable means having a control handle located above and in rear of the keyboard and close to the keyboard.

4. A power operated typewriter having a rotatively mounted and horizontally disposed toothed snatch roll extending transversely of the typewriter for actuating type bars and other parts of the typewriter, an electric motor, a first V-belt pulley, means for rotatively driving the first pulley by [th] *the* motor about a fixed axis, a second V-belt pulley connected with the snatch roll to rotate the roll and rotative about a fixed axis parallel to that of the first pulley, a pair of coaxial and divided variable diameter V-belt pulleys, means supporting the divided pulleys for rotation about an axis parallel to those of the first and second pulleys, *said supporting means being resiliently supported to maintain tension of the belts engaged therewith* and shiftable to move the coaxial pulleys as a unit transversely of the respective pulley axes, a V-belt connecting said first pulley and one of the divided pulleys, a second V-belt connecting said second pulley and the other one of the divided pulleys, and typist controlled means for shifting said supporting means for the coaxial pulleys.

5. A power operated typewriter [as claimed in claim 4] *having a rotatively mounted and horizontally disposed toothed snatch roll extending transversely of the typewriter for actuating type bars and other parts of the typewriter, an electric motor, a first V-belt pulley, means for rotatively driving the first pulley by the motor about a fixed axis, a second V-belt pulley connected with the snatch roll to rotate the roll and rotative about a fixed axis parallel to that of the first pulley, a pair of co-axial and divided variable diameter V-belt pulleys, means supporting the divided pulleys for rotation about an axis parallel to those of the first and second pulleys and shiftable to move the co-axial pulleys as a unit transversely of the respective pulley axes, a V-belt connecting said first pulley and one of the divided pulleys, a second V-belt connecting said second pulley and the other one of the divided pulleys, and typist controlled means for shifting said supporting means for the co-axial pulleys,* wherein the shiftable supporting means for the coaxial divided pulleys comprises a carrying axle for said pulleys, a bar extending fore and aft of the typewriter and to which said axle is fixed, a pull spring suspending the rear end of the bar from a fixed part of the typewriter, and a fore and aft rockable arm suspending the forward end of the bar from a fixed part of the machine.

6. A power operated typewriter, as claimed in claim 5, wherein said rockable arm is a pendent arm of a bellcrank lever which also has a forwardly extending arm, and wherein the typist controlled means comprises a second lever extending transversely of the typewriter and rockable about a fore and aft extending fixed axis, means connecting one end of said second lever with the forwardly extending arm of the bellcrank lever to rock the latter lever in both directions about its axis, a spring urging said second lever in a direction to move its bellcrank lever connected end downwardly, a fore and aft extending roller on the other end of the second lever, a cam disk rotative about a fixed fore and aft extending axis and having a low pitched spiral periphery engaged over said roller, and a finger knob connected with the cam disk forwardly of the disk for conjoint coaxial rotation of the knob and disk, and stop means for limiting rotation of the knob and disk in both directions.

7. A power operated typewriter, as claimed in claim 6, wherein the means connecting the bellcrank lever and second lever comprises a pair of fore and aft extending pressure-equalizing arms coaxially pivoted at their rear ends on the bellcrank lever to swing up and down about an axis parallel to that of the bellcrank lever, a pull spring connecting said arms to normally yieldably hold them pressed one upwardly and the other downwardly against the forward arm of the bellcrank lever and against the downwardly spring urged end of the transversely extending lever.

8. A power operated typewriter having a rotatably mounted power roll for actuating instrumentalities of the typewriter upon transitory connection thereof with the power roll, an electric motor having a rotative drive shaft, a speed responsive positive clutch having a driving member constantly connected with the motor shaft and a driven member positively engageable with said driving member in response to rotation of said driving member at a rated speed determined by said clutch, and a speed reducing and torque increasing pulley and belt power roll driving train constantly connecting the driven member of the clutch with the power roll, whereby upon engagement of said positive clutch the power roll is suddenly subjected to the momentum of said motor, and whereby each time continuous rotation of the roll is blocked during driving actuation of said driving train, said continuous rotation is converted into a rotary oscillative movement of the roll.

9. A power operated typewriter, as claimed in claim 8, wherein typist settable means are provided for controlling said pulley and belt drive to vary the speed of rotation of the power roll.

10. A power operated typewriter having a rotatably mounted toothed snatch roll rotative in one direction to actuate type bars of the typewriter, an electric motor, a typist controllable change speed pulley and belt drive constantly connected with the roll, and a centrifugal positive clutch conditioned to automatically connect the motor to the pulley and belt drive when the motor is energized for rotating the roll continuously in said one direction and to automatically disconnect the motor from said drive each time the motor is deenergized and each time rotation of the roll in type bar actuating direction is blocked while the motor is energized, whereby the continuous rotation of the roll is converted into a rotary oscillative movement of the roll during such blocking.

*11. A typewriter having a rotatively mounted power*

*roll for actuating type bar and other actions of the typewriter upon transitory connection of selected actions with the roll, a motor having a rotative drive shaft, a speed responsive positive clutch having a driving part constantly connected with the motor shaft and a driven part positively engageable with the driving part only while the motor shaft is rotating substantially at or above a rated speed determined by said clutch, and a drive train having energy storing capacity and constantly connecting the driven clutch part with the roll for concomitant rotation of the driven clutch part and roll, whereby upon engagement of said positive clutch the roll is suddenly subjected to the momentum of said motor, and whereby each time continuous rotation of the roll is blocked during driving actuation of said drive train, said continuous rotation is converted into a rotary oscillative movement of the roll.*

*12. A power operated typewriter having a rotatively mounted power roll for actuating type bars and other parts of the typewriter, an electric motor, a first pulley, means for rotatively driving the first pulley by the motor about a fixed axis, a second pulley connected with the power roll to rotate the roll and rotative about a fixed axis parallel to that of the first pulley, a variable diameter pulley assembly, means supporting the pulley assembly for rotation about an axis parallel to those of the first and second pulleys, a belt connecting said first pulley and the input side of said pulley assembly, a second belt connecting said second pulley and the output side of said pulley assembly, and typist controlled means for actuating said pulley assembly to vary the speed ratio between said first and second pulleys having a typist actuatable input element disposed on the face of the typewriter at which the keys thereof are located.*

*13. A power operated typewriter having a rotatably mounted power roll for actuating instrumentalities of the typewriter upon transitory connection thereof with the power roll, an electric motor having a rotative drive shaft, a speed responsive positive clutch having a driving member constantly connected with the motor shaft and a driven member positively engageable with said driving member in response to rotation of said driving member at a rated speed determined by said clutch, and a drive train having energy storing capacity and constantly connecting the driven member of the clutch with the power roll, whereby upon engagement of said positive clutch the power roll is suddenly subjected to the momentum of said motor, and whereby each time continuous rotation of the roll is blocked during driving actuation of said drive train, said continuous rotation is converted into a rotary oscillative movement of the roll.*

*14. A power operated typewriter having a rotatably mounted power roll rotative in one direction to actuate type bars of the typewriter, a motor, a drive train having energy storing capacity and constantly connected with the roll, and a centrifugal positive clutch conditioned to automatically connect the motor to the input of said drive train when the motor is energized for rotating the roll continuously in said one direction and to automatically disconnect the motor from said drive train each time the motor is deenergized and each time rotation of the roll in the type bar actuating direction is blocked while the motor is energized, whereby the continuous rotation of the roll is converted into a rotary oscillative movement of the roll during such blocking.*

*15. A power operated typewriter having a rotatably mounted power roll rotative in one direction to actuate type bars of the typewriter, a motor, and a drive train having energy storing capacity and interconnecting said motor with the roll including means conditioned to automatically connect the motor to the power roll through said drive train when the motor is energized for rotating the roll continuously in said one direction and to automatically disconnect the motor from said power roll each time the motor is de-energized and each time rotation of the roll in type bar actuating direction is blocked while the motor is energized, whereby the continuous rotation of the roll is converted into a rotary oscillative movement of the roll during such blocking.*

*16. The typewriter defined in claim 15 wherein said means is a centrifugal positive clutch.*

*17. In a power operated typewriter, a rotatably mounted power roll for actuating instrumentalities of the typewriter upon selective individual transitory connection thereof with the power roll and the continuous rotation of which may be blocked by such instrumentalities upon improper simultaneous selective connection of a plurality of such instrumentalities thereto, an electric motor, a drive train interconnecting said motor and said power roll, and means automatically operative upon blocking of said power roll by the improper connection of such instrumentalities thereto to actuate the power roll to release said power roll by terminating the improper selective connection of such instrumentalities thereto.*

*18. The typewriter defined in claim 17 wherein said power roll release means is driven by said motor.*

*19. In a power operated typewriter, a rotatably mounted power roll for actuating instrumentalities of the typewriter upon selective transitory connection thereto with the power roll and the continuous rotation of which may be blocked by such instrumentalities upon improper selective connection of such instrumentalities thereto, a motor, a drive train interconnecting said motor and said power roll, and means automatically operative upon blocking of said power roll by the improper connection of such instrumentalities thereto to actuate said power roll to release said power roll by terminating the improper selective connection of such instrumentalities thereto.*

*20. In a power operated typewriter, a rotatably mounted power roll for actuating instrumentalities of the typewriter upon selective transitory connection with the power roll and the continuous rotation of which may be blocked by such instrumentalities upon improper selective connection of such instrumentalities thereto, a motor, a drive train interconnecting said motor and said power roll, and means automatically operative upon blocking of said power roll by the improper connection of such instrumentalities thereto to impart oscillatory motion to said power roll so long as its rotation is blocked to thereby release said power roll by terminating the improper selective connection of such instrumentalities thereto.*

References Cited in the file of this patent or the original patent

UNITED STATES PATENTS

| | | |
|---|---|---|
| 2,043,393 | Pasinski | June 9, 1936 |
| 2,079,351 | Judelshon | May 4, 1937 |
| 2,244,443 | Brady | June 3, 1941 |
| 2,531,891 | Reppert | Nov. 28, 1950 |
| 2,573,197 | Hart | Oct. 30, 1951 |
| 2,756,860 | Lambert et al. | July 31, 1956 |
| 2,734,613 | Kennedy et al. | Feb. 14, 1956 |

FOREIGN PATENTS

| | | |
|---|---|---|
| 158,326 | Switzerland | Jan. 16, 1933 |